US012105860B2

(12) United States Patent
Kaluzhny

(10) Patent No.: US 12,105,860 B2
(45) Date of Patent: Oct. 1, 2024

(54) FLASH PROGRAMMING RANDOMIZATION

(71) Applicant: WINBOND ELECTRONICS CORPORATION, Taichung (TW)

(72) Inventor: Uri Kaluzhny, Beit Shemesh (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 97 days.

(21) Appl. No.: 17/877,953

(22) Filed: Jul. 31, 2022

(65) Prior Publication Data
US 2024/0037285 A1    Feb. 1, 2024

(51) Int. Cl.
| *G06F 17/16* | (2006.01) |
| *G06F 21/54* | (2013.01) |
| *G06F 21/79* | (2013.01) |
| *G06F 21/56* | (2013.01) |
| *G06F 21/75* | (2013.01) |
| *G06F 21/77* | (2013.01) |
| *G06F 21/78* | (2013.01) |
| *G11C 16/10* | (2006.01) |

(52) U.S. Cl.
CPC .............. *G06F 21/79* (2013.01); *G06F 17/16* (2013.01); *G06F 21/54* (2013.01)

(58) Field of Classification Search
CPC .......... G06F 17/16; G06F 21/54; G06F 21/79; G06F 17/10; G06F 21/75; G06F 21/56; G06F 21/77; G06F 21/78; G11C 16/10; H04L 9/003
See application file for complete search history.

(56) References Cited

U.S. PATENT DOCUMENTS

| 8,259,501 | B2 | 9/2012 | Lee et al. | |
| 10,534,554 | B2 | 1/2020 | Tran et al. | |
| 11,188,237 | B2 * | 11/2021 | Tran | G11C 16/10 |
| 2012/0300548 | A1 * | 11/2012 | Lee | G11C 16/0483 365/185.12 |
| 2021/0287125 | A1 * | 9/2021 | Maslov | G06N 10/00 |

OTHER PUBLICATIONS

"Overview of Sattolo's Algorithm"—Mark C. Wilson, Department of Computer Science, University of Auckland (New Zealand), Jun. 21, 2004 https://algo.inria.fr/seminars/summary/Wilson2004b.pdf (Year: 2004).*
"Side-Channel Collision Attack Based on Multiple-Bits"—Yuan et al, Institute of Microelectronics, Tsinghua University, Feb. 8, 2018 https://ieeexplore.ieee.org/document/8285732.*
Wilson, "Overview of Sattolo's Algorithm," Algorithms Seminar 2002-2004, Chyzak (ed.), INRIA, pp. 105-108, year 2005.

* cited by examiner

*Primary Examiner* — Randy A Scott
(74) *Attorney, Agent, or Firm* — MEITAR PATENTS LTD.

(57) ABSTRACT

A memory device includes a non-volatile memory (NVM) and a secure-programming circuit (SPC). The SPC is configured to receive a program-NVM instruction to program a given data word in a given location of the NVM, and, responsively to receiving the program-NVM instruction, to program bits of the given data word in the NVM in a random order.

6 Claims, 2 Drawing Sheets

FLASH PROGRAMMING RANDOMIZATION

FIELD OF THE INVENTION

The present invention relates generally to non-volatile memories, and particularly to methods and systems for secure programming of flash devices.

BACKGROUND OF THE INVENTION

Flash memories and, in particular, embedded flash memories may store confidential data and, hence, should be protected from eavesdropping ("hacking").

U.S. Pat. No. 11,188,237 describes multiple embodiments for enhancing security and preventing hacking of a flash memory device. The embodiments prevent malicious actors from hacking a flash memory chip to obtain data that is stored within the chip. The embodiments include the use of fault detection circuits, address scrambling, dummy arrays, password protection, improved manufacturing techniques, and other mechanisms.

SUMMARY OF THE INVENTION

An embodiment of the present invention that is described herein provides a memory device including a non-volatile memory (NVM) and a secure-programming circuit (SPC). The SPC is configured to receive a program-NVM instruction to program a given data word in a given location of the NVM, and, responsively to receiving the program-NVM instruction, to program bits of the given data word in the NVM in a random order.

In some embodiments, the given data word consists of two to the power of N bits, and the SPC is configured to generate a random permutation of two to the power of N values, and to program the bits of the given data word in an order that follows the random permutation. In an embodiment, the SPC is configured to generate the random permutation by multiplying an invertible binary matrix by a vector including respective bits of a count so as to produce a product, and adding a vector of random bits to the product. In an example embodiment, the invertible matrix is a triangular binary matrix including a main diagonal, a first triangle and a second triangle, the main diagonal includes "1" values, the first triangle includes "0" values and the second triangle includes random bits.

There is additionally provided, in accordance with an embodiment of the present invention, a method for secure programming of a non-volatile memory (NVM). The method includes receiving a program-NVM instruction to program a given data word in a given location of the NVM. Responsively to receiving the program-NVM instruction, bits of the given data word are programmed in the NVM in a random order.

The present invention will be more fully understood from the following detailed description of the embodiments thereof, taken together with the drawings in which:

DETAILED DESCRIPTION OF EMBODIMENTS

Overview

Hackers sometimes attempt to obtain the contents of an NVM (or parts thereof) by a side channel attack, for example by monitoring the power consumption, or the radiated electromagnetic energy.

In particular, integrated circuits that comprise both a flash memory and read/write circuitry to read and write the flash memory (e.g., a processor with an embedded flash) are usually hard to hack by direct methods, as the data exchange between the read/write circuitry and the NVM storage is not directly visible on the external pins of the integrated circuit.

Some flash devices employ a bit-serial programming technique, wherein bits of a data word to be programmed are serially written into the NVM storage array. After erasure, the flash cells are typically at a given logic value (e.g., logic-1), and, hence, programming of logic-1 value does not consume power, whereas programming of a logic-0 consumes a significant amount of energy. By monitoring the power supply current, a hacker may be able to detect when a logic-0 or a logic-1 are programmed. If the bits are written in a given order—e.g., from LSB to MSB, or vice-versa, the hacker could easily reconstruct the programmed word.

Embodiments of the present invention that are disclosed herein provide circuits and methods to secure NVM from side channel attacks. In an embodiment, the IC comprises a Secure Programming Circuit (SPC), that is configured to program words in the flash array at a random bit order; hence, a side-attack will reconstruct a useless random shuffle of the programming word bits.

In some embodiments, the SPC comprises a programming-word register, configured to store the word to be programmed; a counter, configured to count the bits being programmed, a scrambler, configured to generate random permutations of the count, a multiplexer, configured to select a bit of the programming word register according to the random permutations of the count, and a serial programming circuit, configured to program bits in the flash array with the value selected by the multiplexer.

In some embodiments, the scrambler generates random permutations of the count by multiplying an invertible (e.g., triangular) matrix of random bits by a binary representation of the count, and adding a vector of random bits to the product.

System Description

Figure 1:
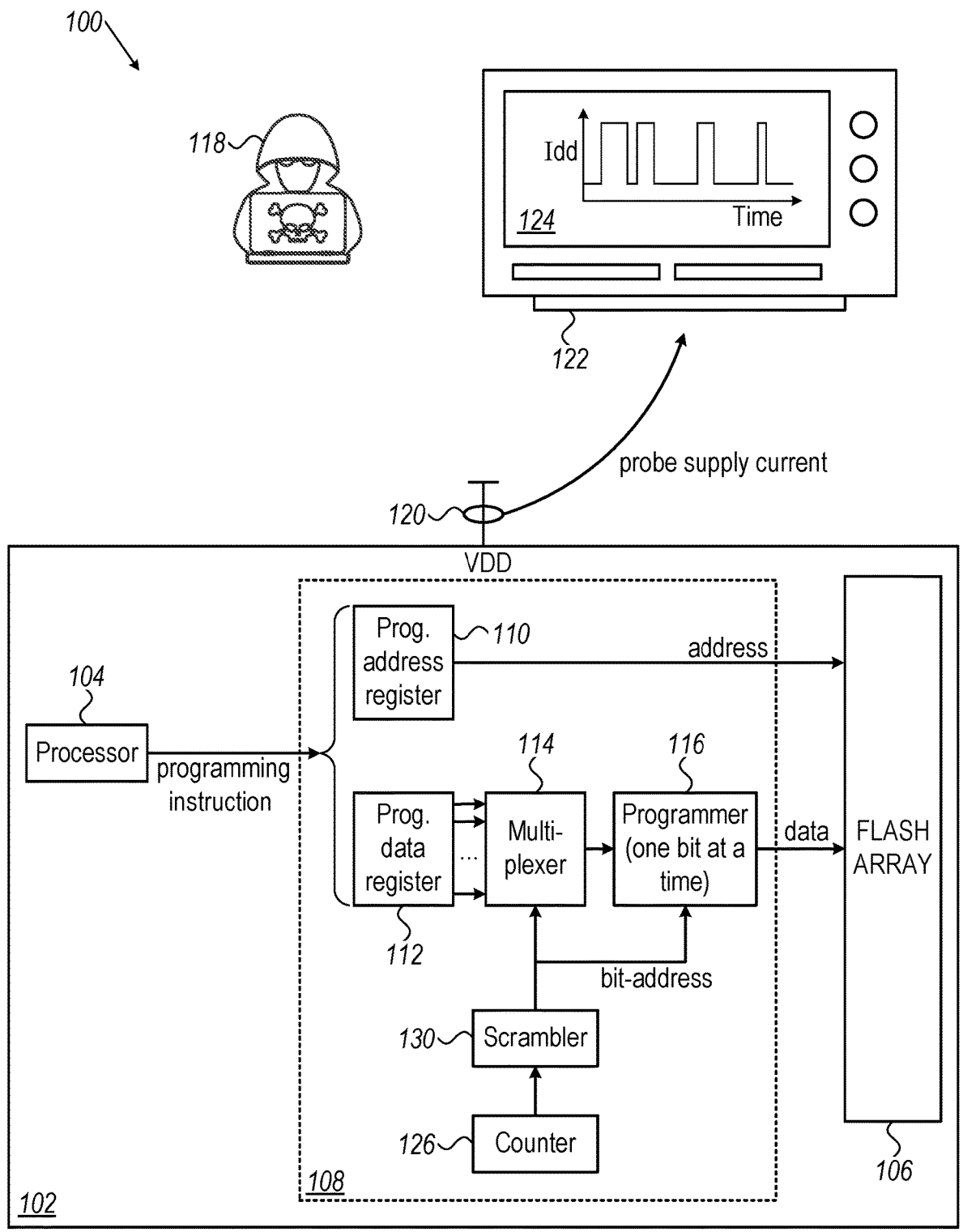
FIG. 1 is a block diagram that schematically illustrates a secure embedded-flash Integrated-Circuit (IC), in accordance with an embodiment of the present invention.

FIG. 1 is a block diagram that schematically illustrates a secure embedded-flash Integrated-Circuit (IC) 102 that is subject to a side-channel attack 100, in accordance with an embodiment of the present invention.

IC 102 comprises a processor 104 and a Flash memory 106 (in some embodiments, other types of non-volatile memory can be used). In an embodiment, Flash memory 106 comprises a plurality of banks; each bank comprises a plurality of words, and each word comprises a plurality of individual non-volatile cells. In some embodiments each cell stores one bit.

When processor 104 erases a bank, all cells in the bank are set to a known logic value. Traditionally the erase value is arbitrarily denoted as logic-1; thus, no action is needed to program a logic-1 in a flash cell of an erased bank.

To program a word (e.g., 32 bits) in an erased bank of flash array 106, processor 104 sends a programming instruction to a secure-programming circuit (SPC) 108. The programming instruction may comprise an address field that the SPC stores in a programming-address-register 110, and a data field that the SPC stores in a programming data register 112. A multiplexer 114 sequentially selects bits of the programming data register and forwards the selected bits to a bit-programmer circuit 116, which is configured to program one bit at a time, at a flash array word that is pointed to by programming address register 110. As explained above, programming is done only to programming data register bits that are at logic-0.

A Hacker 118 attempts to read that data that programmer 116 programs in flash 106. The hacker uses a side channel attack and observes the power supply current that IC 102 consumes, using a current probe 120 that is input to an Oscilloscope 122. As mentioned, the current consumption of IC 102 is significantly higher when the programming circuit programs a logic-0 than it is when a logic-1 is programmed. Thus, by observing a waveform 124 displayed on the oscilloscope screen, the hacker can tell when a logic-0 is programmed.

However, according to the example embodiment illustrated in FIG. 1, the order of the programmed bits is random, and the hacker will not be able to reconstruct the written data word. For example, if IC 102 programs a security key in flash 106, the key that the hacker will read will be bit-scrambled.

To randomize the order in which the bits of programming data register 112 are programmed, SPC 108 further comprises a counter 126, which is configured to count the programmed bits; and a scrambler 130, which randomly scrambles the output of the counter, using a one-to-one random mapping. Multiplexer 114 is coupled to the output of the scrambler and will thus randomly select bits of programming data register 112 to be programmed. For example, assuming an 8-bit programming data register, scrambler 130 may output the sequence 2,7,0,1,5,3,4,6, which will be the order in which the programming circuit programs the word in the flash. The output of the scrambler is also the bit-address input of programming circuit 116.

In the context of the present patent application and in the claims, the term "random" (as used, for example, in "random order", "random bits", "random sequence", "random permutation", etc.), in various grammatical forms, refers to both truly random and pseudo-random values or events.

The configuration of channel-attack scenario 100, and the configuration of IC 102, including SPC 108, illustrated in FIG. 1 and described hereinabove are examples that are cited for the sake of conceptual clarity. Other configurations may be used in alternative embodiments. For example, in an embodiment, the side channel that the hacker uses may be the return current to the Vdd pin (not shown); in another embodiment the hacker may measure a voltage drop across a resistive or an inductive path in the printed circuit. In some embodiments, the hacker measures electromagnetic radiation emitted from IC 102, and in yet other embodiments the hacker may use other means such as a microphone, an infra-red detector, and others.

In an embodiment, counter 126, scrambler 130, programming data register 112 and multiplexer 128 are not needed. Instead, processor 104 sends bits, in a scrambled order, to programming circuit 116.

In some embodiments, the flash array stores two or more bits per cell. For example, in an embodiment a flash cell may be not-programmed, weakly programmed, mediumly programmed and strongly programmed. The four states typically represent two stored bits, having the value of 00, 01, 10 and 11, respectively. (Weak, medium or strong relate to a measure of the charge trapped in a floating gate of the flash cell.) A hacker can tell if a 00, 01, 10 or 11 is programmed to a flash cell by observing the current from the Vdd supply; however, in embodiment, the order of the bit-pairs is scrambled, and the hacker will get a scrambled collection of bit-pairs.

Figure 2:
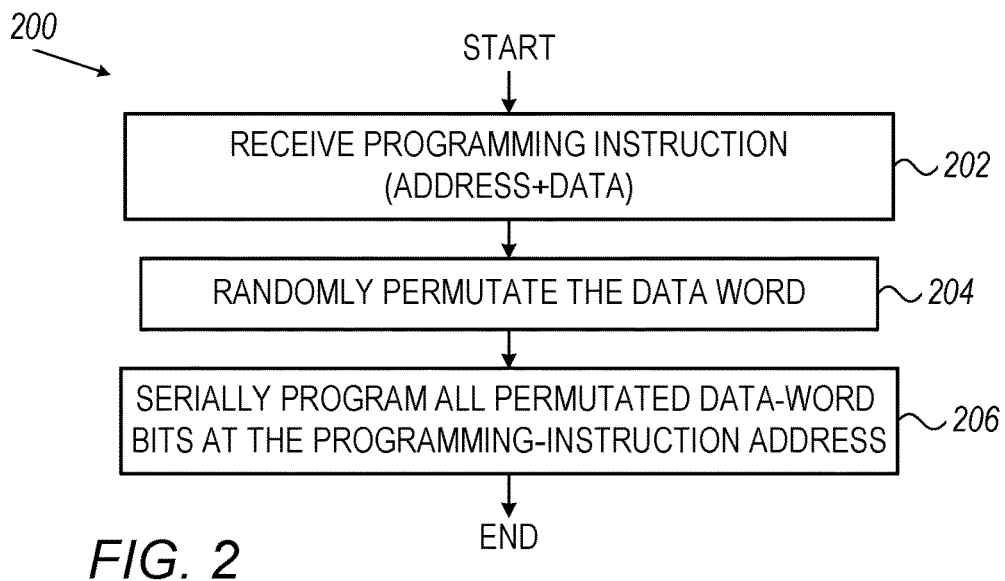
FIG. 2 is a flowchart that schematically illustrates a method for secure flash programming, in accordance with an embodiment of the present invention.

FIG. 2 is a flowchart 200 that schematically illustrates a method for a secure flash programming, in accordance with an embodiment of the present invention. The flowchart is executed by SPC 108 (FIG. 1).

The flowchart starts at a Receive-Programming-Word operation 202, wherein the SPC receives a programming instruction (e.g., from processor 104, FIG. 1) comprising an address word and a data word, to be programmed in flash array 106 (FIG. 1). The data word may be a secret, e.g., a cypher key.

Next, in a Random-Permute operation 204, the IC generates a permutation map of all bits of the programming word. Such a permutation map maps each bit position of the programming word to a unique position, using a random one-to-one mapping.

The SPC then, at a Serial-Programming operation 206, serially programs the bits of the programming data word in the flash array, at the address indicated by the programming instruction, according to the permutated order. For example, if bits 0,1,2,3 of the programming data word are mapped to 2,1,0,3, the SPC will first program bit-2 of the programming data word, then bit 1, followed by bit 0 and bit 3. After operation 206 the flowchart ends.

Thus, according to the example flowchart illustrated in FIG. 2, The SPC programs the bits of a programming data word in a flash array, at the address indicated by the program instruction, and at a random bit order, rendering side-channel attacks difficult.

The flowchart illustrated in FIG. 2 and described above is cited by way of example. Other suitable flowcharts may be used in alternative embodiments. For example, in some embodiments, SPC 108 prepares the permutation map before receiving the program instruction. In an embodiment, the SPC, while programming a bit of the programming data word, determines a next random bit to be programmed from the bits that were not yet programmed.

Permutation Method

In embodiments, a plurality of methods to generate the permutation map may be used.

Figure 3:
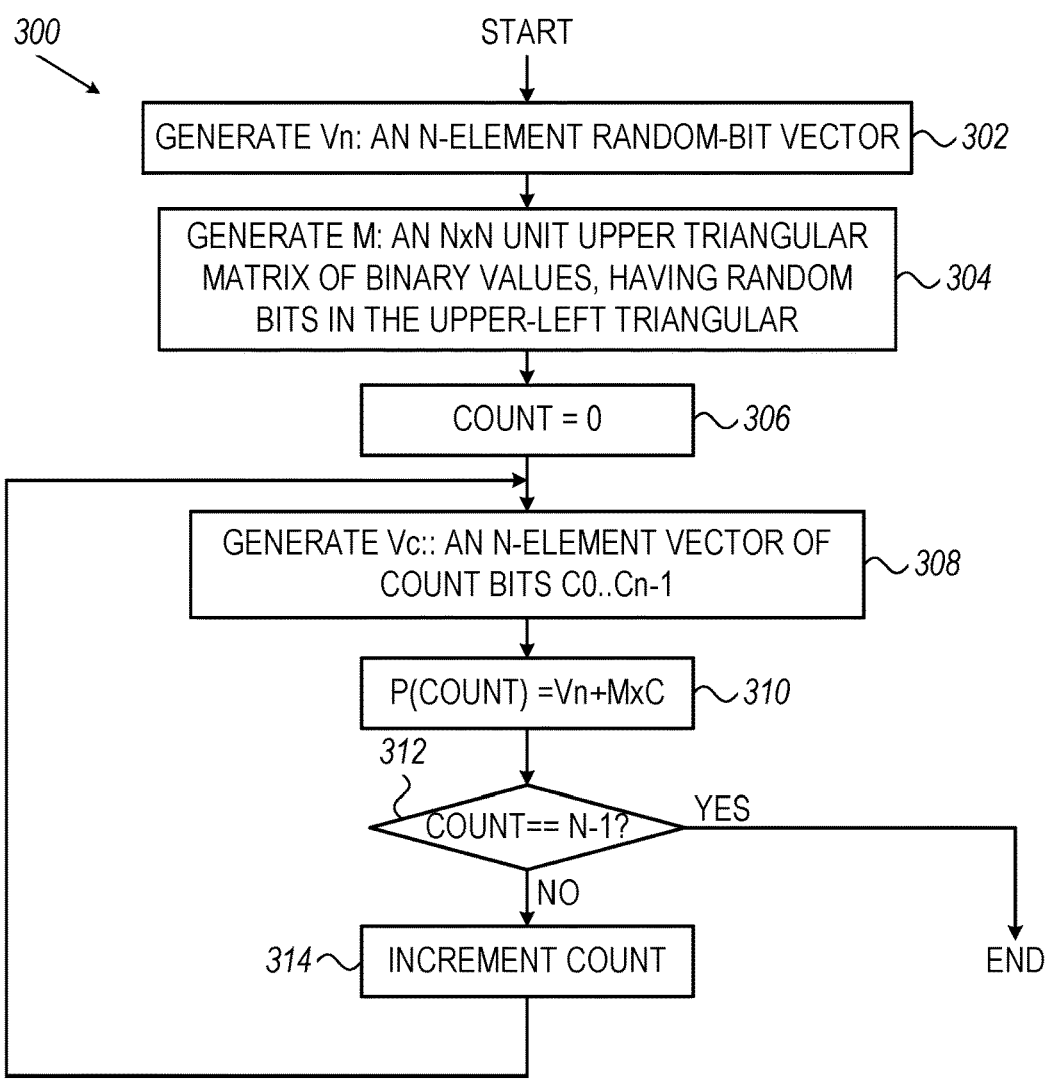
FIG. 3 is a flowchart that schematically illustrates a method for generating a permutation map, in accordance with an embodiment of the present invention.

FIG. 3 is a flowchart 300 that schematically illustrates a method for generating a permutation map, in accordance with an embodiment of the present invention. The flowchart is executed by scrambler 130 (FIG. 1).

The flowchart starts at a Generate Random Vector operation 302, wherein the scrambler generates a vector V of N random bits, designated $rnd_0$ to $rnd_{N-1}$ (shown below for N=8):

$$V_n = \begin{pmatrix} rnd_0 \\ rnd_1 \\ \vdots \\ rnd_7 \end{pmatrix}$$

Next, at a Generate Matrix M operation 304, the SPC generates an invertible N×N matrix, in the present example a N×N triangular matrix M, having "1" values in the main diagonal, random bits ($R_i$) in one of the two triangles (the triangle above the main diagonal or the triangle below the main diagonal) and having "0" values in the other triangle. For example, an upper-right-diagonal matrix, having random numbers $rnd_i$ in the upper-right triangle and "0" in the lower-left triangle can be used, as shown below (for N=8):

$$M = \begin{pmatrix} 1 & rnd_8 & \ldots & rnd_{14} \\ 0 & 1 & \ldots & rnd_{20} \\ \vdots & \vdots & \ddots & \vdots \\ 0 & 0 & \ldots & 1 \end{pmatrix}$$

The SPC now enters a Clear-Count operation 306, and clears a Count register, indicating that a first bit (starting from 0) is now to be programmed.

Next, the SPC enters a Generate $V_c$ operation 308, and generates a vector $V_c$, comprising the bits of Count (shown below for N=8):

$$V_c = \begin{pmatrix} cnt_0 \\ cnt_1 \\ \vdots \\ cnt_7 \end{pmatrix}$$

Then, at a generate permutation vector operation 310, the SPC generates the permutation vector $V_p$ according to:

$$V_p = V_n + M * V_c$$

where addition is binary exclusive-or, and multiplication is a binary AND function. Operation 310 is shown below for N=8:

$$\begin{pmatrix} out_0 \\ out_1 \\ \vdots \\ out_7 \end{pmatrix} = \begin{pmatrix} rnd_0 \\ rnd_1 \\ \vdots \\ rnd_7 \end{pmatrix} + \begin{pmatrix} 1 & rnd_8 & \ldots & rnd_{14} \\ 0 & 1 & \ldots & rnd_{20} \\ \vdots & \vdots & \ddots & \vdots \\ 0 & 0 & \ldots & 1 \end{pmatrix} \begin{pmatrix} cnt_0 \\ cnt_1 \\ \vdots \\ cnt_7 \end{pmatrix}$$

The SPC then, at a Check-count-done operation 312, checks if the permutation of the last bit position (corresponding to count=$2^N-1$) has been permuted, and, if so, ends the flowchart. If, in operation 312, the count is not done, the SPC enters an Increment count operation 314, increments Count, and then reenters operation 308, to permute the next value of count.

The configuration of flowchart 300 illustrated in FIG. 3 and described hereinabove is cited by way of example. Other configurations can be used in alternative embodiments. For example, in alternative embodiments other suitable types of invertible matrices, not necessarily triangular, can be used. As another example, in some embodiments, Sattolo algorithm is used (see, for example, "Overview of Sattolo's Algorithm" by M. Wilson, Algorithms Seminar 2002-2004, F. Chyzak (ed.), INRIA, (2005), pp. 105-108). (However, the Sattolo algorithm is not sequential, and, if used, a suitable circuit should be added to output the permutation bits one by one.)

The configurations of IC 102, including SPC 108 and the methods of flowcharts 200 and 300, illustrated in FIGS. 1 through 3 and described hereinabove, are example configurations and flowcharts that are shown purely for the sake of conceptual clarity. Any other suitable configurations and flowcharts can be used in alternative embodiments.

The different sub-units of IC 102, including SPC 108 may be implemented using suitable hardware, such as in one or more Application-Specific Integrated Circuits (ASICs) or Field-Programmable Gate Arrays (FPGAs), using software, using hardware, or using a combination of hardware and software elements.

processor 104 and/or SPC 108 (FIG. 1) may comprise one or more general-purpose processors, which are programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Although the embodiments described herein mainly address secure NVM programming, the methods and systems described herein can also be used in other applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A memory device, comprising:
   a non-volatile memory (NVM); and
   a secure-programming circuit (SPC) configured to:
      receive a program-NVM instruction to program a given data word to an NVM word at a specified address of the NVM, the data word consisting of two to the power of N bits;
      generate a random permutation of two to the power of N values; and
      responsively to receiving the program-NVM instruction, program bits of the given data word sequentially, bit-by-bit, to the NVM word at the specified address of the NVM, while (i) preserving bit positions of the programmed bits in the NVM word as in the given data word, but (ii) setting a temporal order that determines which bit to program before which other bit, in an order that follows the random permutation.

2. The memory device according to claim 1, wherein the SPC is configured to generate the random permutation by:
   multiplying an invertible binary matrix by a vector comprising respective bits of a count, to produce a product; and
   adding a vector of random bits to the product.

3. The memory device according to claim 2, wherein the invertible matrix is a triangular binary matrix comprising a main diagonal, a first triangle and a second triangle, wherein the main diagonal comprises "1" values, the first triangle comprises "0" values and the second triangle comprises random bits.

4. A method for secure programming of a non-volatile memory (NVM), the method comprising:
   receiving a program-NVM instruction to program a given data word to an NVM word at a specified address of the NVM;
   generating a random permutation of two to the power of N values; and
   responsively to receiving the program-NVM instruction, programming bits of the given data word sequentially, bit-by-bit, to the NVM word at the specified address of the NVM, while (i) preserving bit positions of the programmed bits in the NVM word as in the given data word, but (ii) setting a temporal order that determines which bit to program before which other bit, in accordance with an order that follows the random permutation.

5. The method according to claim 4, wherein generating the random permutation comprises:
   multiplying an invertible binary matrix by a vector comprising respective bits of a count, to produce a product; and
   adding a vector of random bits to the product.

6. The method according to claim 5, wherein the invertible matrix is a triangular binary matrix comprising a main diagonal, a first triangle and a second triangle, wherein the main diagonal comprises "1" values, the first triangle comprises "0" values and the second triangle comprises random bits.

* * * * *